Jan. 5, 1926.  1,568,109
R. VENZLAFF
STEPPER
Original Filed Feb. 16, 1921   2 Sheets-Sheet 1
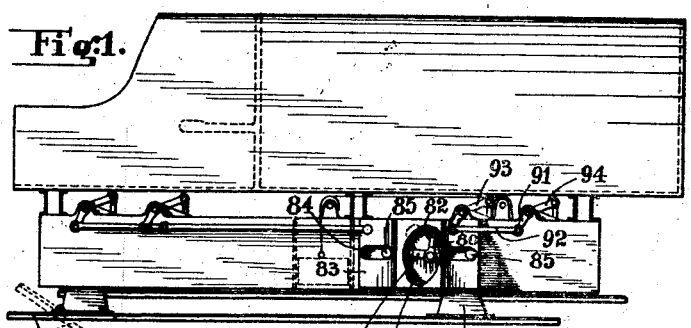
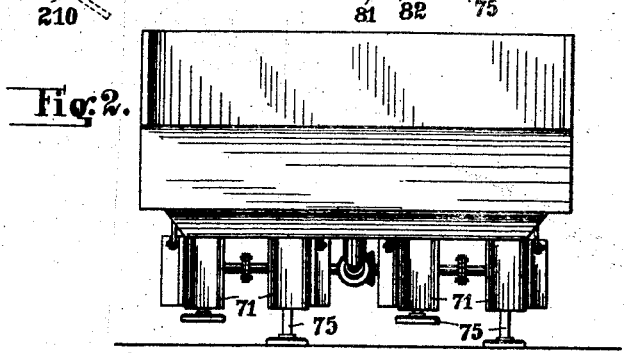
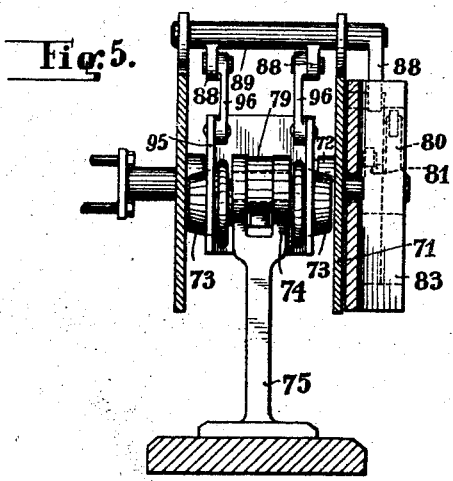
Inventor
Richard Venzlaff
by Whitehall
Attorney.

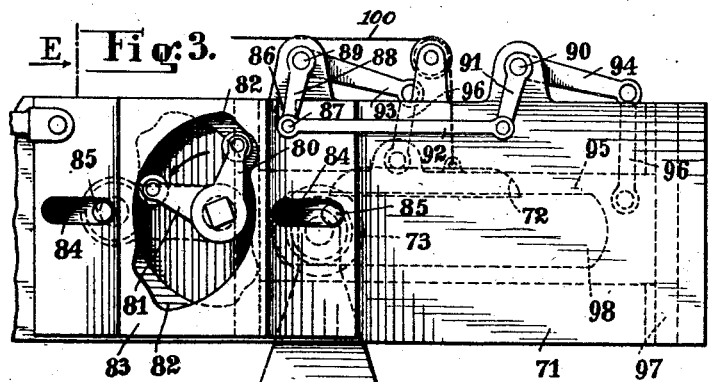
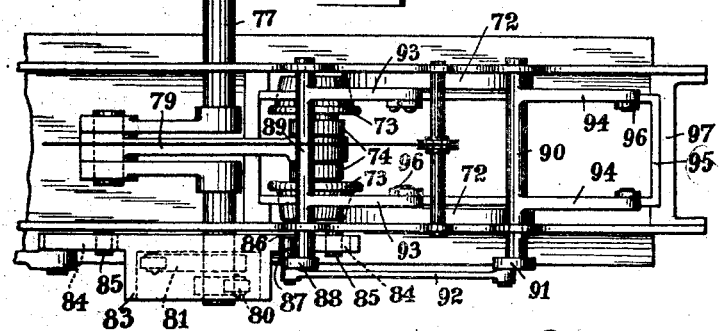
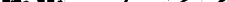
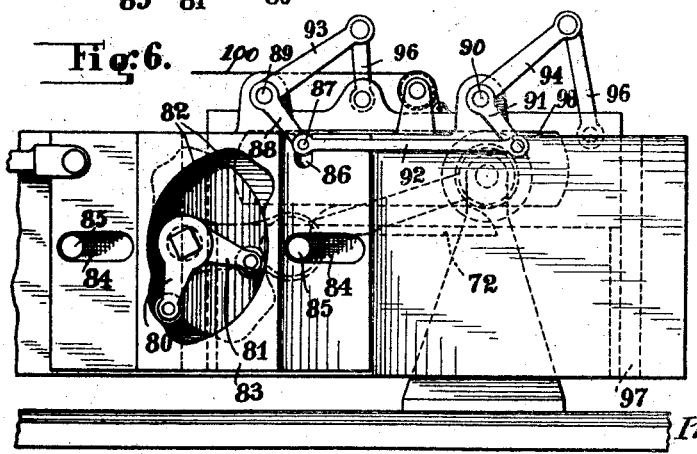

Patented Jan. 5, 1926.

1,568,109

UNITED STATES PATENT OFFICE.

RICHARD VENZLAFF, OF BERLIN, GERMANY, ASSIGNOR OF TWO-THIRDS TO ARTHUR VON MUMM AND WALTER VON MUMM, BOTH OF BERLIN, GERMANY.

STEPPER.

Original application filed February 16, 1921, Serial No. 445,552. Divided and this application filed March 23, 1922, Serial No. 546,175. Renewed November 28, 1925.

*To all whom it may concern:*

Be it known that I, RICHARD VENZLAFF, a citizen of Germany, residing at Berlin, Germany, have invented certain new and useful Improvements in Steppers, of which the following is a specification.

My invention relates to vehicles and more especially to vehicles gliding across supports carried along by the vehicle itself. For the transport of loads across uneven roads or in regions lacking good roads, it has already been repeatedly proposed to employ in the place of vehicles fitted with wheels and besides the class of vehicles commonly known as "tanks" and operating by means of endless link-chains, vehicles moving on runners which are alternately raised and then set down on the ground and across which the vehicle then glides forward. As soon therefore as the underframe along with the body has glided across a set of runners, in order to pass over on to another set which has meanwhile been moved forward, the first set of runners is raised from the ground and shifted forward along the underframe only to be set down again on the ground in front of the underframe and once again to serve as a support for the underframe as it glides forward.

In vehicles of this particular kind it proved difficult to get along with only two sets of runners, because the set temporarily raised from the ground could scarcely ever be lowered quick enough again and placed in front of the underframe, to enable this latter to move along uninterruptedly and without a hitch.

It is the object of my invention to provide a vehicle of the type specified adapted to move along uninterruptedly on only two sets or pairs of runners.

In the drawings affixed to this specification and forming part thereof, a vehicle having only two sets of runners and embodying my invention is illustrated by way of example. In the drawings—

Figs. 1 and 2 are a side elevation and end view, respectively, of the vehicle provided with means for raising and lowering the runners.

Fig. 3 is a part elevation of the rear-end vehicle sections on an enlarged scale, Fig. 4 is a plan of the rear-end sections of a runner, along with the appropriate driving mechanism.

Fig. 5 is a cross section on line E—E in Fig. 3.

Fig. 6 an elevation corresponding to that shown in Fig. 3, with the parts, however, shown in different working positions.

Referring to the drawings, the frame 71 is moved forward by the crank shaft 77 causing it by means of connecting rods 79 to glide on the rails 72 across the rollers 73 of the pair of runners which happens to rest on the ground. The crank shaft located in the frame 71 is driven by the aid of cone gears (not shown) from the motor shaft which extends horizontally in the longitudinal direction. The rails 72 are fixed to the beams 71 forming the frame. The rollers 73 are disposed alongside of the forked heads of the feet 75 which are connected by the connecting rods 79 with the four throw crank shaft 77. The cranks are alternately displaced 180°, the first and third and the second and fourth runner co-operating with one another. On the crank shaft 77 turning from the right hand into the left hand dead centre position (Fig. 6), the connecting rod 79 pulls the feet 75 which are raised above the ground, forward across the rails 72 attached to the frame. As this takes place during the time in which the frame is also pushed across the rollers of the feet resting on the ground, (each movement being effected by one half stroke of the crank), the runners will always be placed in time in front of the frame whereby a continuous forward motion of the frame is produced.

For the purpose of raising and lowering the runners, there are arranged for each runner on the crank shaft side by side two arms 80 and 81 directed at right angles to one another, the one destined for driving ahead and the other for reverse. The two arms act alike though counter to one another, and according to the direction in which the vehicle is propelled, only one or the other arm will enter into operation. Each arm operates in one of two cam grooves 82 formed side by side in a horizontal slide 83 moving by aid of slots 84 on studs 85 projecting from the underframe. In an opening 86 formed at the upper end of the slide there engages a pivot 87 arranged at the end of a lever 88 mounted on an axle 89 located in bearings connected with the frame. Another axle 90 extending in parallel thereto and carrying an arm 91, is coupled with the axle 89 by a connecting rod 92. On each axle there is mounted a pair of arms 93 and 94, respectively, extending at right angles to the levers 88 and 91 and serving to raise and lower, respectively, two slotted slides 95 suspended from the arms 93 and 94, respectively, by links 96 and moving in vertical guides 97 arranged on the underframe. These slides 95 are provided with slots 98 on the lower edge of which the rollers 73 come to rest when the runner is raised. The shape of the cam groove within which the arm 80 moves, is such that on the underframe gliding forward with the rails 72 across the rollers 73 belonging to the runners resting on the ground for the time being, the slide 83 will assume the position disclosed in Fig. 3. The rails 72 having moved across the rollers 73, arm 80 forces the slide 83 to the rear. By this means the lever 88 which engages the opening 86 of the slide, is rocked backward and slides 95 and the rollers 73 resting therein as also the runners bearing the rollers are raised (Fig. 6), whereupon the crank draws the rollers forward in slot 98 and across the rail. This having been effected, arm 80 causes the slide 83 to move forward, whereby the lever arm 88 is caused to rock forward and the slide 95 along with the runner suspended therefrom to be lowered, so that the parts return into the position shown in Fig. 3.

During backward driving the arm 81 comes to operate in the cam groove appertaining to it and which is displaced 180° with regard to the other groove, in the same manner as arm 80. In this case slide 83 is displaced in the counter direction for the purpose of raising and lowering the runners.

In order to save power, I have found it expedient to equalize the weight of the slides by counterweights acting on a rope 100 which engage it by suitable means, and this in such a manner that the cam shaft when elevating will not be required to perform any excessive work.

The front portion 210 of each runner can be arranged to turn about a hinge pin so as to assume an oblique position in case that an obstacle is encountered.

I wish it to be understood that I do not desire to be limited to the exact details of construction shown and described, for obvious modifications will occur to a person skilled in the art.

I claim:

1. A vehicle of the kind described comprising in combination two pairs of runners adapted to be alternately moved forward, a frame adapted to glide across said runners and a horizontal shaft extending across said frame, horizontal slides with cam slots adapted to be displaced on said frame, an arm on said shaft adapted to move within and in contact with said slot, slides connected with said runners and adapted to be displaced vertically on said frame for lifting said runners and connecting rods establishing an operative connection between said shaft and said runners.

2. A vehicle of the kind described comprising in combination, two pairs of runners, adapted to be alternately moved in horizontal direction, a frame adapted to glide across said runners a horizontal crank shaft extending across said frame connecting rods for transmitting motion from said crank shaft to said runners, horizontal slides with cam slots adapted to be displaced on said frame, an arm on said shaft adapted to move within and in contact with each slot, slides connected with said runners and adapted to be displaced vertically on said frame for lifting said runners, and means for counterbalancing said vertical slides.

In testimony whereof I affix my signature.

RICHARD VENZLAFF.